United States Patent
Bocharov

(10) Patent No.: US 12,373,211 B2
(45) Date of Patent: *Jul. 29, 2025

(54) INTER-PROCESS SERVING OF MACHINE LEARNING FEATURES FROM MAPPED MEMORY FOR MACHINE LEARNING MODELS

(71) Applicant: CLOUDFLARE, INC., San Francisco, CA (US)

(72) Inventor: Oleksandr Bocharov, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,776

(22) Filed: Jan. 16, 2024

(65) Prior Publication Data

US 2025/0036407 A1 Jan. 30, 2025

Related U.S. Application Data

(63) Continuation of application No. 18/359,818, filed on Jul. 26, 2023, now Pat. No. 11,875,151.

(51) Int. Cl.
 *G06F 9/30* (2018.01)
 *G06F 9/50* (2006.01)

(52) U.S. Cl.
 CPC .......... *G06F 9/3004* (2013.01); *G06F 9/5016* (2013.01)

(58) Field of Classification Search
 CPC ............................ G06F 9/3004; G06F 9/5016
 See application file for complete search history.

(56) References Cited

U.S. PATENT DOCUMENTS

| | | | |
|---|---|---|---|
| 6,938,085 B1 * | 8/2005 | Belkin | G06F 9/5055 709/215 |
| 2023/0125477 A1 * | 4/2023 | Gurumurthy | G06N 3/08 382/103 |

OTHER PUBLICATIONS

"What is RCU?—"Read, Copy, Update"—The Linux Kernel documentation" Jun. 19, 2023, 22 pages, downloaded at: https://web.archive.org/web/20230619151015/https://www.kernel.org/doc/html/next/RCU/whatisRCU.html.
"Zero-copy deserialization", Jul. 7, 2021, 3 pages, downloaded at: https://github.com/rkyv/rkyv/blob/master/book_src/ zero-copy-deserialization.md.
Bocharov, Alex, "Every request, every microsecond: scalable machine learning at Cloudflare", The Cloudflare Blog, Jun. 19, 2023, 19 pages, downloaded at: https://blog.cloudflare.com/scalable-machine-learning-at-cloudflare/.

(Continued)

*Primary Examiner* — Michael J Metzger
(74) *Attorney, Agent, or Firm* — NICHOLSON DE VOS WEBSTER & ELLIOTT LLP

(57) ABSTRACT

Inter-process serving of machine learning features from mapped memory for machine learning models is described. ML features are populated in a data structure that is serialized. State data is stored that indicates that reader process (es) are to read from a first memory mapped data file and not a second memory mapped data file. The serialized bytes are stored in the second memory mapped data file and the state data is updated to indicate that the reader process(es) are to read from the second memory mapped data file. A request is received and parsed to prepare keys from attributes of the request. Based on the state data, the serialized bytes are read from the second memory mapped data file that correspond to the keys. The serialized bytes are deserialized and copied to a data structure available to an inference algorithm.

21 Claims, 4 Drawing Sheets

(56) References Cited

OTHER PUBLICATIONS

Mmap-sync README, Cloudflare, 2023 15 June, 4 pages, downloaded at: https://github.com/cloudflare/mmap-sync/blob/main/README.md.
Notice of Allowance, U.S. Appl. No. 18/359,818, Sep. 19, 2023, 8 pages.
Ramalhete, et al., "Left-Right: A Concurrency Control Technique with Wait-Free Population Oblivious Reads", Oct. 2015, 11 pages.

* cited by examiner

INTER-PROCESS SERVING OF MACHINE LEARNING FEATURES FROM MAPPED MEMORY FOR MACHINE LEARNING MODELS

CROSS-REFERENCE TO RELATED APPLICATIONS

This application is a continuation of application Ser. No. 18/359,818, filed Jul. 26, 2023, which is hereby incorporated by reference.

FIELD

Embodiments of the invention relate to the field of machine learning; and more specifically, to inter-process serving of machine learning features from mapped memory for machine learning models.

BACKGROUND

Machine learning processing often includes a step of feature extraction and preparation. The features are extracted from input data and may be further preprocessed and then served to an inference model to be processed. Some models rely on multiple data features that are aggregated across multiple dimensions in a sliding time window. Such models provide higher-quality predictions compared to single-feature models but are also more resource intensive and time consuming. The features file for such models may be stored in a file that is periodically updated. Accessing the file may be done over a Unix socket when the data is not in cache.

SUMMARY

Inter-process serving of machine learning features from mapped memory for machine learning models is described. A server includes a machine learning (ML) feature manager service that populates a first data structure with ML features that include inter-request features that leverage aggregated information across a plurality of dimensions in a sliding time window, serializes the first data structure, and stores the serialized first data structure into mapped memory using a wait-free synchronization technique. The server further includes a request processing module that receives a request and parses the request to extract a plurality of keys from attributes of the request, the request processing module including an ML feature library service that reads serialized bytes from the mapped memory that correspond to the plurality of keys, deserializes the serialized bytes, and copies the deserialized bytes into a second data structure available to an inference algorithm for processing. The wait-free synchronization technique may include maintaining two separate memory-mapped files for storing ML features and using synchronization state to coordinate access by the ML feature library to the two separate memory-mapped files. Serializing the first data structure may be done according to a zero-copy deserialization technique, and deserializing may include only a pointer addition and a cast to an array of numerical float features or categorical features.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Inter-process serving of machine learning features from mapped memory for machine learning models is described. A memory-mapped file is used as the Inter-Process Communication (IPC) mechanism for serving the machine learning features. Compared to other forms of IPC (e.g., TCP socket, Unix socket, FIFO pipe, Message queue), the memory-mapped file IPC mechanism has lower latency. The system includes a process that fetches, parses, and stores the features file in mapped memory. This process is referred herein as a machine learning (ML) feature manager service. The ML feature manager service is designed for batch processing of large data quantities and extensive I/O operations. The system further includes a process that reads the features file from mapped memory and serves the features to the inference algorithm. This process is referred herein as a ML feature library. The ML feature library is optimized for minimal resource usage and ultra low-latency (measured in nanoseconds) without the need for heavy I/O operations.

The ML feature manager service uses a wait-free synchronization technique to provide high concurrency wait-free reads over a single writer instance. The ML feature manager service maintains two copies of the ML features file in separate memory-mapped files. The ML feature manager service has write access to the data and multiple readers (e.g., ML feature library instances) are able to access the data concurrently. Synchronization state coordinates access to these ML features file data copies in another memory-mapped file using atomic instructions. Further, the ML feature manager service may use a zero-copy deserialization technique to reduce the time and memory required to access and use the ML features.

The ML feature library does not perform heap allocations. The ML feature library re-uses pre-allocated data structures and only performs low-cost stack allocations. For instance, a first pre-allocated data structure is to contain pointers to request attributes (e.g., user-agent, etc.) and a second pre-allocated data structure is to contain ML features and performed detections. Further, when possible, the ML feature library may employ SIMD instructions (e.g., AVX2 and SSE4 instruction sets to expedite hex-decoding or base64-decoding of request attributes).

Figure 1:
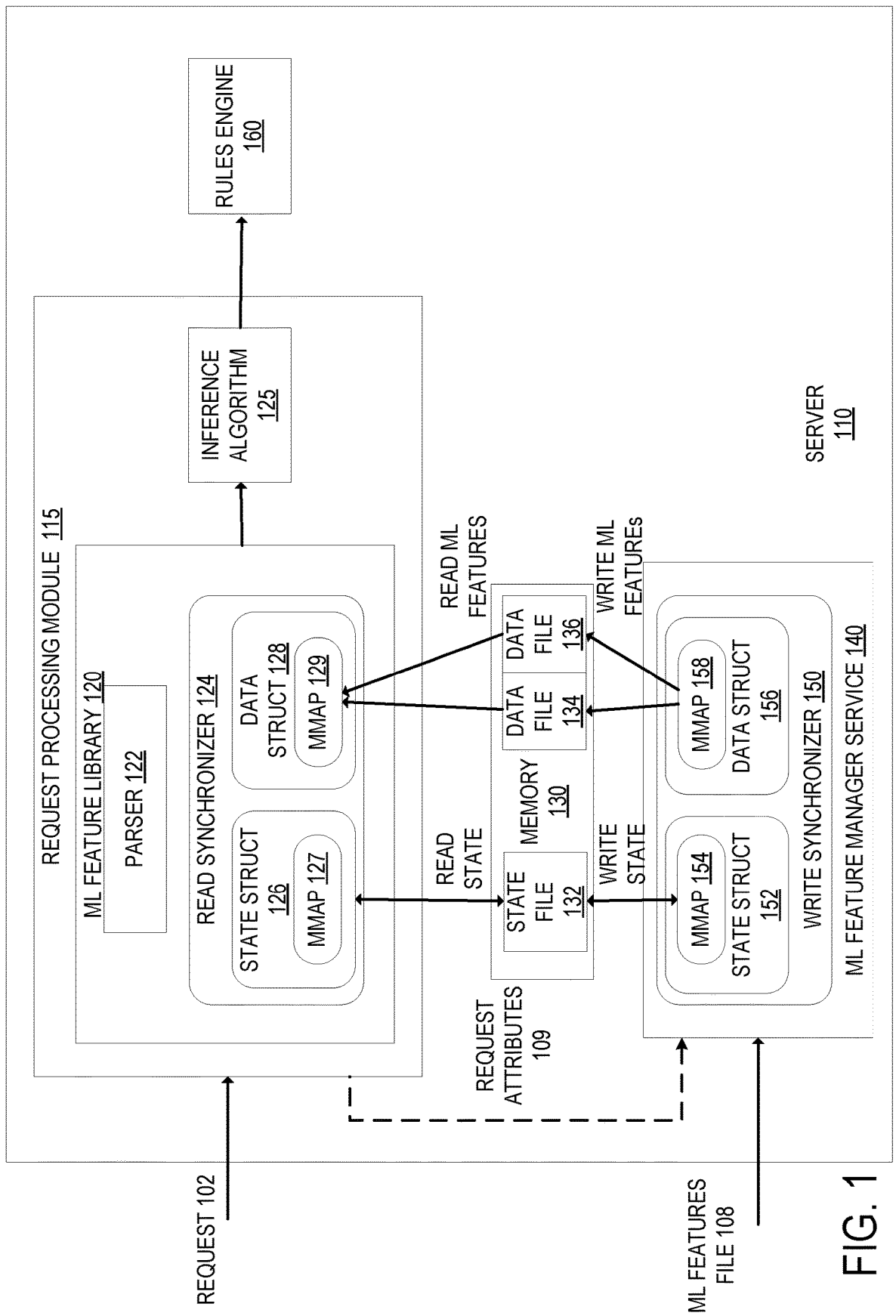
FIG. 1 illustrates an exemplary server for serving machine learning features to an inference model from memory according to an embodiment.

FIG. 1 illustrates an exemplary server for serving machine learning features to an inference model from memory according to an embodiment. The server 110 receives network traffic (e.g., HTTP/S requests) and processes the traffic using a machine learning model. The machine learning model may identify traffic that is malicious such as being from malicious bots. The server 110 may be part of one data center of multiple data centers of a distributed cloud computing network. Each data center may include one or more servers, one or more DNS servers (e.g., one or more authoritative name servers, one or more proxy DNS servers), and one or more other pieces of network equipment such as router(s), switch(es), and/or hubs. The server 110 may operate as a reverse proxy or a forward proxy. In either case, the server 110 may receive requests from client devices for content located on the distributed cloud computing network and/or external to the distributed cloud computing network. Although not shown in FIG. 1, the machine learning model may be trained at a separate server (e.g., a control server) and the model may be distributed to the server 110 and other compute servers of the distributed cloud computing network. There can be multiple ML models using different sets of ML features, which further improves system efficiency as features are only fetched once per request and served to multiple ML models.

The server 110 includes the request processing module 115 that processes requests (e.g., HTTP/S requests). The request processing module 115 includes the machine learning (ML) feature library 120 and the inference algorithm 125. The ML feature library 120 uses the parser 122 to parse an incoming request to extract keys from the request attributes. Various request attributes can be used for keys including from layer 3 to layer 7 (in the OSI model). The ML feature library 120 retrieves the ML features from the memory 130 using the read synchronizer 124, which will be described in greater detail later herein. These features are then input to the inference algorithm 125 for processing. The machine learning models may run on each request (e.g., each HTTP/S request). As an example, these model(s) can compute a score that indicates a probability that the request is from a bot or otherwise malicious.

The server 110 further includes the ML feature manager service 140. The ML feature manager service 140 downloads or otherwise receives an ML features file 108 from a separate server (e.g., a centralized server), parses the received ML features file, and stores the ML features and dimensions in the memory 130 and/or aggregates features based on incoming traffic and then stores them in shared memory. The ML dimensions stored in the memory 130 may be specific values of dimensions such as user-agent, IP, or other request attributes that are served as keys. The ML features stored in the memory 130 may be served as values. The ML features file 108 is tailored for the storage and retrieval of machine learning features. Essentially, it acts as a structured data blob, holding vast amounts of key-value pairs, where keys may represent specific dimension identifiers, such as IP addresses or user agents, and the values are the corresponding features that have been computed or extracted. The primary objective of the ML features file 108 is to efficiently store and make accessible a large volume of features, making it particularly beneficial for tasks like batch processing in machine learning pipelines. The ML feature manager service 140 may also store ML features metadata in the memory 130 such as version, checksum, creation timestamp, etc. The ML feature manager service 140 may perform these functions periodically. Such a period may be in the order of seconds or minutes (e.g., every 5 minutes). Thus, the ML feature manager service 140 may write to the memory 130 on a regular basis. Although the ML features file may be received periodically and regularly, embodiments can be performed where the ML features file is expected to be not updated as frequently or even not at all.

The ML features file 108 may include inter-request features that leverage aggregated information across multiple dimensions of a request in a sliding time window such as the number of unique user agents associated with certain attributes. The aggregation of features may be done at the centralized server and/or at the server 110. For example, the request processing module 115 may communicate request attributes 109 to the ML feature manager service 140 for aggregation. Thus, based on previous requests received at the first server (and made available within single-digit milliseconds to subsequent requests), the ML features can be aggregated by the server 110.

In an embodiment, the memory 130 is a shared mapped memory that allows for writing and reading to be done concurrently. For example, the ML feature manager service 140 can write to the memory 130 and the ML feature library 120 can read from the memory 130 concurrently. In an embodiment, there may be a single instance of the ML feature manager service 140 and multiple instances of the ML feature library 120 per server. For example, there may be a separate ML feature library 120 for each processor core of the server 110. Thus, there may be a single writer to the shared mapped memory and multiple readers of the data stored in the shared mapped memory.

The ML feature manager service 140 includes the write synchronizer 150 to write data to the shared memory 130. The write synchronizer 150 writes to memory-mapped files and uses wait-free synchronization to provide high concurrency wait-free reads over a single writer instance. The write synchronizer 150 maintains two copies of the data in separate memory-mapped files. Write access to this data is managed by the write synchronizer 150 and multiple readers (e.g., multiple instances of the ML feature library 120) can access the data concurrently. The write synchronizer 150 writes data to one data file while the readers (e.g., the read synchronizer 124 of the ML feature library 120) read data from the other file. The write synchronizer 150 specifies which data file is current using atomic instructions over a memory mapped file storing a state (the state file 132). After the write is confirmed, the write synchronizer 150 switches the feature version using an atomic variable so that the readers start reading from the newly written data. For example, the write synchronizer 150 includes the data struct 156 that stores a data mmap 158 that represents an opened file handler of the data file 134 that is mapped in memory 130 and the data file 136 that is mapped in memory 130. The write synchronizer 150 also stores a state file as a memory-mapped file. The state file refers to the synchronization state that coordinates access to the data copies. The state file stores the index of the current data file and the number of active readers for each index, updated via atomic instructions. For instance, the state file includes an atomic integer (e.g., a 64-bit integer), which represents an Instance Version and a pair of additional atomic variables (e.g., 32-bit variables), tracking the number of active readers for each data copy. The Instance Version includes the currently active data file index (e.g., 1 bit), the data size (e.g., 39 bits, accommodating data sizes up to 549 GB), and a data checksum (e.g., 24 bits). The write synchronizer 150 includes the state struct 152 that includes the mmap 154 that represents an opened file handler to the state file 132 that is mapped in memory 130.

In an embodiment, the ML feature manager service 140 serializes the ML features and dimensions according to a zero-copy deserialization technique and writes the serialized data in the memory 130 (e.g., the appropriate one of the data file 134 and the data file 136). In a zero-copy deserialization, no data is copied during deserialization and no work is done to deserialize the data. This is done by structuring the data's encoded representation to match the in-memory representation of the source type. The zero-copy deserialization technique allows the direct referencing of bytes in a serialized form. This reduces the time and memory required for accessing and using the data. In another embodiment, the ML feature manager service 140 serializes the ML features and dimensions according to a partial zero-copy deserialization technique. In a partial zero-copy deserialization technique, some bytes can be directly referenced in their serialized form but the structure must still be parsed.

The ML feature library 120, which can be loaded into the memory of the request processing module 115, serves ML features to the inference algorithm 125. The ML feature library 120 reads the ML features from the memory 130 that correspond to the extracted keys from the request attributes. The processing of the ML feature library 120 may be wait-free and allocations-free. Being wait-free includes serving the ML features without waiting or locking. Being allocations free includes reusing pre-allocated data-structures and not performing heap allocations. For instance, a first pre-allocated data structure is to contain pointers to request attributes (e.g., user-agent, etc.) and a second pre-allocated data structure is to contain ML features and performed detections. Further, when possible, the ML feature library 120 may employ SIMD instructions (e.g., AVX2 and SSE4 instruction sets to expedite hex-decoding or base64-decoding of request attributes).

The ML feature library 120 includes the read synchronizer 124, which can read memory-mapped files from the memory 130 such as the ML feature data (e.g., one of the data file 134 and the data file 136) and the state data (e.g., the state file 132). The read synchronizer 124 includes the data struct 128 that stores the data mmap 129, which represents an opened file handler to the data file 134 and the data file 136 mapped in the memory 130. The read synchronizer 124 also includes the state struct 126 that stores the state mmap 127 that represents an opened file handler to a state file 132 mapped in the memory 130. The read synchronizer 124 reads from the data file that is current (out of the data file 134 and data file 136) as specified by the state in the state file 132. The files stored in the memory 130 may be serialized according to a zero-copy deserialization technique as described elsewhere. As such, the read synchronizer 124 performs a zero-copy deserialization of the files. No data is copied during the deserialization. Further, no work is done to deserialize the data beyond pointer addition and a cast to the array of numerical float features or categorical features. Categorical features are features which have a finite set of values such as hashes or numbers (e.g., HTTP protocol type, country, etc.).

The ML feature library 120 serves the ML feature data to the inference algorithm 125. The inference algorithm 125 may include one or more inference algorithms that perform detections based on the ML feature data provided. The inference algorithm 125 may be a gradient boosting library or any other suitable inference algorithm. As one example, the inference algorithm 125 may provide a score that indicates a likelihood of whether the request came from a bot. Such a score may be used by a rules engine 160 for processing the request (e.g., blocking the request if the score is indicative of being from a bot, triggering a challenge to the requester if the score is indicative of being from a bot).

Figure 2:
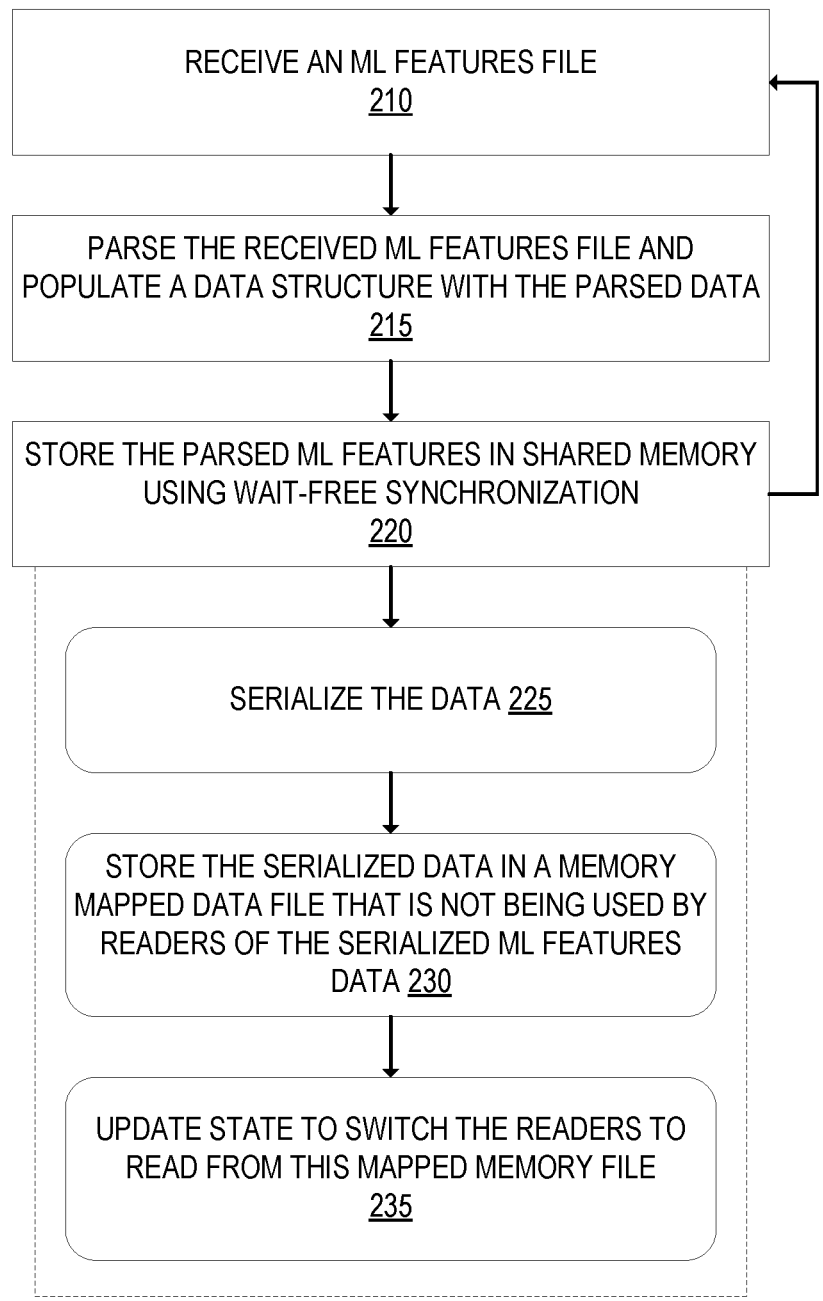
FIG. 2 is a flow chart that illustrates exemplary operations performed by a writer to write machine learning (ML) features to shared memory using wait-free synchronization according to an embodiment.

FIG. 2 is a flow chart that illustrates exemplary operations performed by a writer to write ML features to shared memory using wait-free synchronization according to an embodiment. The operations of FIG. 2 are described with respect to the exemplary embodiment of FIG. 1. However, the operations of FIG. 2 can be performed by embodiments different from that of FIG. 1, and the exemplary embodiment of FIG. 1 can perform different operations from that of FIG. 2.

Prior to the operations of FIG. 2, an instance of the write synchronizer 150 and the read synchronizer 124 is created. During the creation, a path address of the state file 132, a path address of the data file 134, and a path address of the data file 136 is determined.

At operation 210, the write synchronizer 150 of the ML feature manager service 140 receives an ML features file from an external entity (e.g., a configuration or centralized server of a distributed cloud computing network). The write synchronizer 150 may download the ML features file from the external entity or it may receive a pushed ML features file from the external entity. The ML features file can be received periodically such as in the order of seconds or minutes (e.g., every 5 minutes). The ML features may relate to an ML model to identify traffic that is malicious such as being from a malicious bot. The ML features may include inter-request features that leverage aggregated information across multiple dimensions of a request in a sliding time window such as the number of unique user agents associated with certain request attributes.

In addition to, or in lieu of, receiving the ML features file from an external entity, the server 110 may aggregate the ML features based on request attributes 109 received from the request processing module 115.

Next, at operation 215, the write synchronizer 150 parses the received ML features file and populates a data structure with the parsed data. This data structure may be the type of structure in which the read synchronizer 124 is configured to read.

Next, at operation 220, the write synchronizer 150 stores the parsed ML features file in shared memory using a wait-free synchronization technique. The operation 225-235 may be performed by the write synchronizer 150 when performing operation 220.

At operation 225, the write synchronizer 150 serializes the parsed ML features file. In an embodiment, the serialization is done according to a zero-copy deserialization technique. The zero-copy deserialization technique reduces the time and memory required to access and use data by directly referencing bytes in the serialized form. No data is copied during deserialization (done by the read synchronizer 124) and no work is done to deserialize the data beyond pointer addition and a cast to the array of numerical float features or categorical features. The write synchronizer 150 structures the encoded representation of the parsed ML features file to match the in-memory representation of the source type. For example, bytes may be padded to the correct alignment and the fields are laid out exactly the same as they would be in memory. In another embodiment, the serialization is done according to a partial zero-copy deserialization technique.

At operation 230, the write synchronizer 150 stores the serialized data in a memory mapped data file that is not being used by readers of the serialized ML features data. For example, if the read synchronizer 124 is reading from the data file 134, the write synchronizer 150 stores the serialized data in the data file 136. The write synchronizer 150 may determine which data file to write to by accessing the state file 132 which specifies which data file is currently in use.

At operation 235, the write synchronizer 150 updates the state to switch the readers to read from this memory mapped data file. For example, after the write is confirmed, the write synchronizer 150 switches the feature version using an atomic variable so that the readers start reading from the newly written data. For instance, the write synchronizer 150 updates the state file 132 so that the data file that is currently in use is the newly written memory mapped data file.

Figure 3:
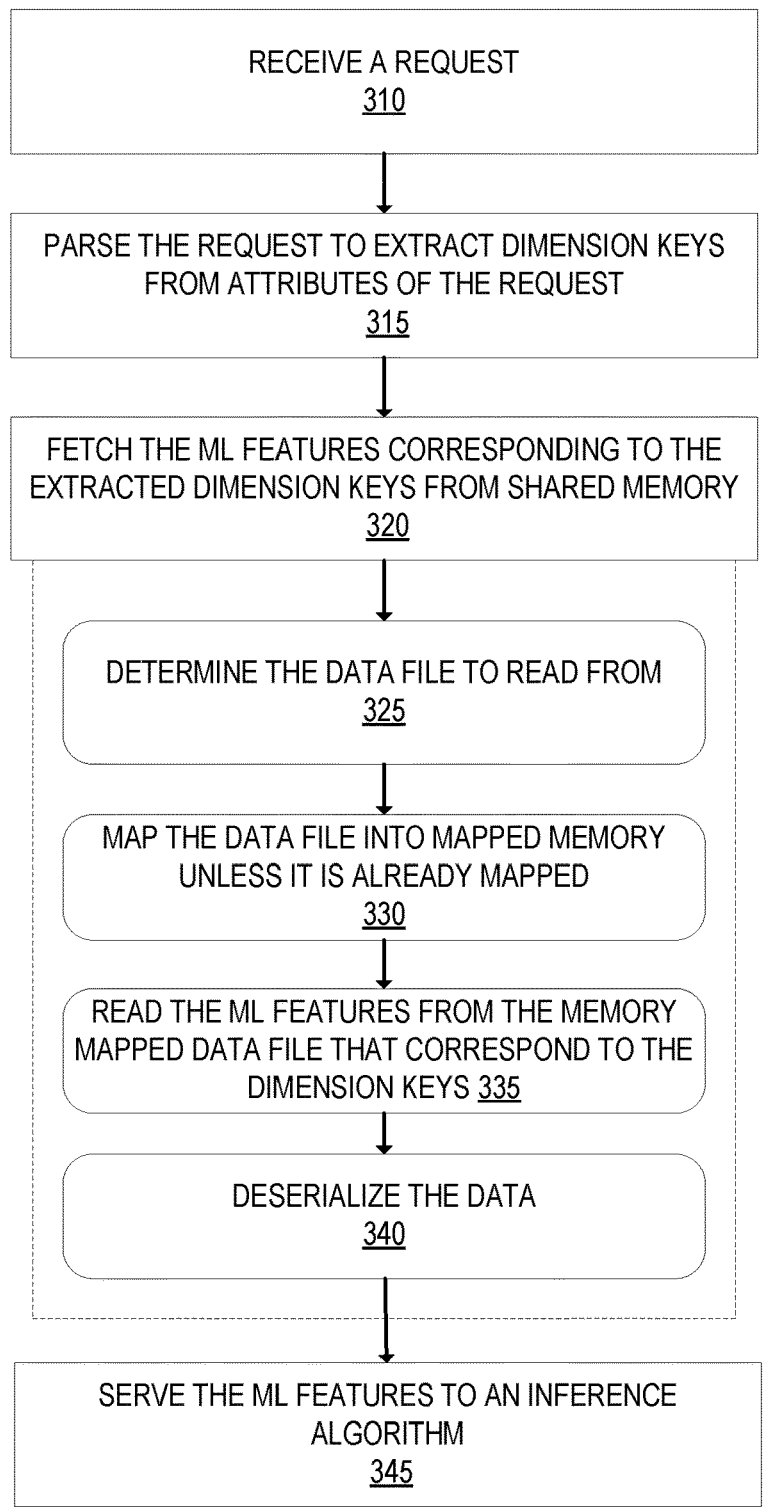
FIG. 3 is a flow chart that illustrates exemplary operations performed by a reader to read ML features from shared memory according to an embodiment.

FIG. 3 is a flow chart that illustrates exemplary operations performed by a reader to read ML features from shared memory according to an embodiment. The operations of FIG. 3 are described with respect to the exemplary embodiment of FIG. 1. However, the operations of FIG. 3 can be performed by embodiments different from that of FIG. 1, and the exemplary embodiment of FIG. 1 can perform different operations from that of FIG. 3. The operations of FIG. 3 can be performed on each request that is received at the server 110.

At operation 310, the request processing module 115 receives a request 102 (e.g., HTTP/S request). The request 102 may be received from a device external to the server 110 (e.g., a client device) and/or may be generated by a process within the server 110. The server 110 uses one or more machine learning models applied to the request to determine whether the request and/or the requester is likely to be malicious such as being from a malicious bot.

Next, at operation 315, the parser 122 of the request processing module 115 parses the request to prepare keys from attributes of the request. Various request attributes can be used for keys including metadata obtained from layer 3 to layer 7 (in the OSI model) protocols such as TCP/UDP/TLS/HTTP/QUIC. The attributes may be at layer 3 to layer 7. The keys may be a hash value of the underlying bytes and an identifier (e.g., a dimension identifier or a feature identifier). These keys may be stored in a hash map data structure or any other suitable struct, which can be serialized using zero-copy deserialization technique or other serialization technique for later use.

Next, at operation 320, the read synchronizer 124 fetches the ML features corresponding to the extracted keys from the memory 130. The operations 325-340 may be performed by the read synchronizer 124 when performing operation 320.

At operation 325, the read synchronizer 124 determines the data file from which to read the ML features (e.g., one of the data file 134 and the data file 136). The read synchronizer 124 reads from the state file 132 to determine which data file to read from. The data file to read from will be the one in which the write synchronizer 150 is not writing to. This data file may not be mapped at this time. At operation 330, the read synchronizer 124 maps the data file into mapped memory unless it is already mapped. To map the data file, the read synchronizer 124 may use a mmap system call.

Next, at operation 335, the read synchronizer 124 reads the ML features that correspond to the keys from the serialized data-structure stored in the memory mapped data file. These ML features may be an array of numerical float features or categorical features. Next, at operation 340, the read synchronizer 124 deserializes the data. In the case where the serialized data structure is serialized using a zero-copy deserialization technique, deserialization may only include pointer addition and a cast to the array of numerical float features or categorical features.

Next at operation 345, the ML features are served to the inference algorithm 125. For example, the read synchronizer 124 copies the deserialized bytes (e.g., the array of numerical float features or categorical features) to a data structure to be used by the inference algorithm 125 to make predictions.

Embodiments described herein improve latency for fetching machine learning features compared to conventional approaches. In addition to latency improvements, the availability of machine learning features is improved due to eliminating the socket timeouts that can occur in conventional solutions. Increased availability leads to fewer false positives and false negatives in detections. Further, embodiments described herein improve resource utilization by decreasing CPU contention that can be experienced using conventional techniques using Unix sockets.

Figure 4:
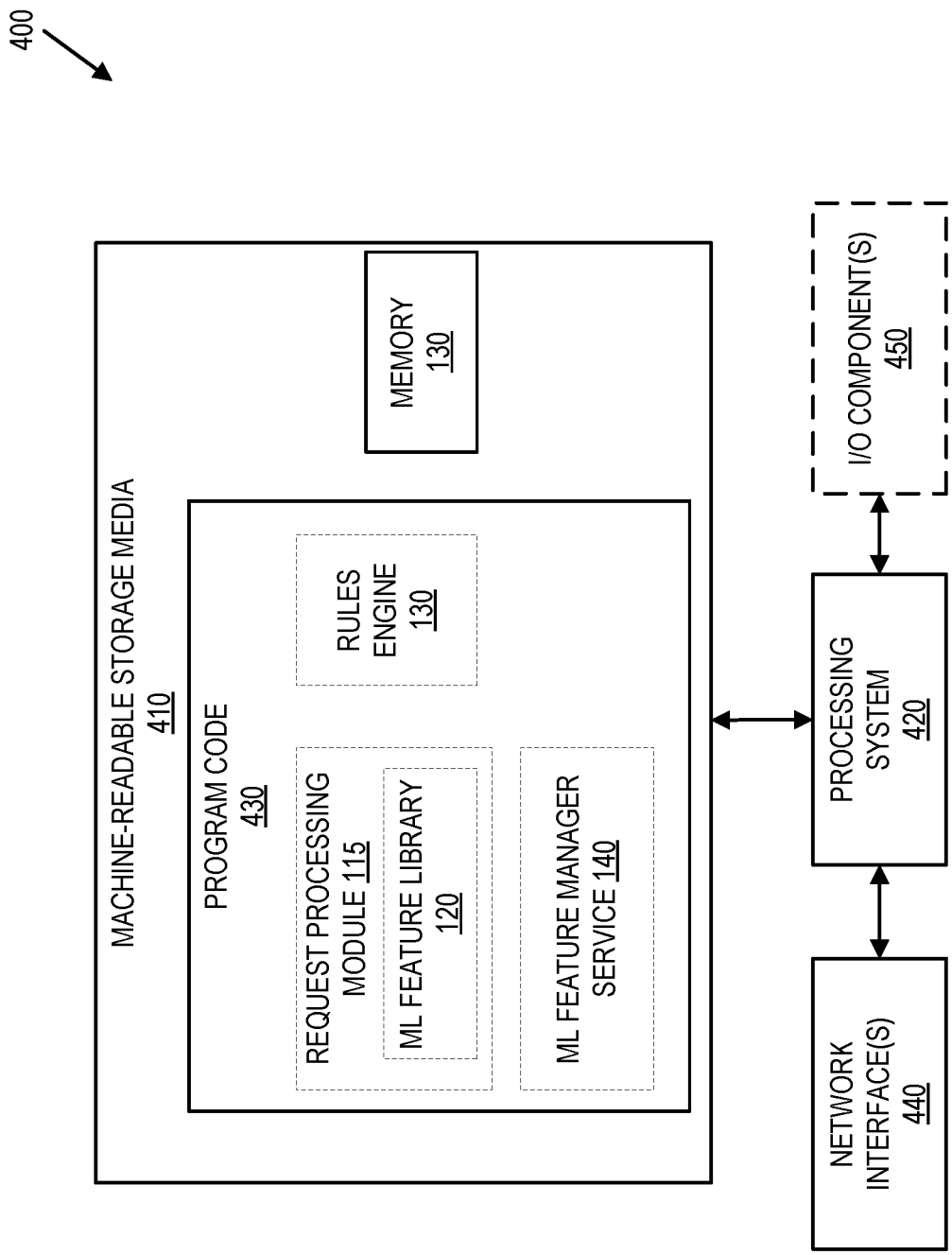
FIG. 4 is a block diagram illustrating a data processing system that can be used in an embodiment.

FIG. 4 illustrates a block diagram for an exemplary data processing system 400 that may be used in some embodiments. One or more such data processing systems 400 may be used to implement the embodiments and operations described with respect to the server 110. The data processing system 400 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals-such as carrier waves, infrared signals), which is coupled to the processing system 420 (e.g., one or more processors and connected system components such as multiple connected chips). For example, the depicted machine-readable storage media 410 may store program code 430 that, when executed by the processing system 420, causes the data processing system 400 to execute the request processing module 115, the ML features library 120, the ML feature manager service 140, the rules engine 160, and/or perform any of the operations described herein. The machine-readable storage media 410 may also include the shared memory 130, which can be stored in any volume of the data processing system 400.

The data processing system 400 also includes one or more network interfaces 440 (e.g., a wired and/or wireless interfaces) that allows the data processing system 400 to transmit data and receive data from other computing devices, typically across one or more networks (e.g., Local Area Networks (LANs), the Internet, etc.). The data processing system 400 may also include one or more input or output ("I/O") components 450 such as a mouse, keypad, keyboard, a touch panel or a multi-touch input panel, camera, other known I/O devices or a combination of such I/O devices. Additional components, not shown, may also be part of the system 400, and, in certain embodiments, fewer components than that shown are used. One or more buses may be used to interconnect the various components shown in FIG. 4.

The techniques shown in the figures can be implemented using code and data stored and executed on one or more electronic devices (e.g., a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals-such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

In the preceding description, numerous specific details are set forth to provide a more thorough understanding. It will be appreciated, however, by one skilled in the art that embodiments may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executing in a first server of a plurality of servers of a distributed cloud computing network, comprising:
    populating a first data structure with machine learning (ML) features;
    serializing the first data structure into bytes;
    storing state data indicating that one or more reader processes are to read from a first memory mapped data file and not a second memory mapped data file;
    writing the serialized bytes to the second memory mapped data file based on the stored state data indicating that that one or more reader processes are to read from the first memory mapped data file and not the second memory mapped data file;
    responsive to the writing of the serialized bytes to the second memory mapped data file being confirmed, updating the state data to indicate that the one or more reader processes are to read from the second memory mapped data file and not the first memory mapped data file;
    receiving a request;
    parsing the request to prepare keys from attributes of the request;
    determining, from the state data, to read from the second memory mapped data file and not the first memory mapped data file;
    reading the serialized bytes from the second memory mapped data file that correspond to the keys;
    deserializing the read serialized bytes; and
    copying the deserialized bytes to a second data structure available to an inference algorithm.

2. The method of claim 1, wherein the ML features are included in an ML features file that is received from a second server of the distributed cloud computing network.

3. The method of claim 2, wherein the ML features file is received periodically in an order of seconds or minutes.

4. The method of claim 1, wherein the ML features are aggregated by the first server based on previous requests received at the first server and made available within single-digit milliseconds to subsequent requests.

5. The method of claim 1, wherein serializing the first data structure into bytes is performed according to a zero-copy deserialization technique, and wherein deserializing the read serialized bytes only includes a pointer addition and a cast to an array of numerical float features or categorical features.

6. The method of claim 5, wherein the zero-copy deserialization technique includes structuring an encoded representation of the first data structure to match an in-memory representation of its source type.

7. The method of claim 1, further comprising:
    wherein the ML features are included in an ML features file that is received from a second server of the distributed cloud computing network;
    receiving an updated ML features file from the second server;
    parsing the received ML features file and populating the first data structure with the parsed data;
    serializing the first data structure into bytes;
    determining, based on the state data, to write to the first memory mapped data file as the second memory mapped data file is active for reading by the one or more reader processes;
    storing the serialized bytes in the first memory mapped data file; and
    updating the state data to indicate that the one or more reader processes are to read from the first memory mapped data file and not the second memory mapped data file for subsequent reads.

8. A server of a plurality of servers of a distributed cloud computing network, the server comprising:
    a processing system; and
    a non-transitory machine-readable storage medium coupled to the processing system, wherein the non-transitory machine-readable storage medium stores instructions that, when executed by the processing system, executes software code including:
        a machine learning (ML) feature manager service that populates a first data structure with ML features, serializes the first data structure, and stores the serialized first data structure into mapped memory using a wait-free synchronization technique; and
        a request processing module that receives a request and parses the request to extract a plurality of keys from attributes of the request, the request processing module including an ML feature library service that reads serialized bytes from the mapped memory that correspond to the plurality of keys, deserializes the serialized bytes, and copies the deserialized bytes into a second data structure available to an inference algorithm for processing.

9. The server of claim 8, wherein the ML features are included in an ML features file that is received from a second server of the distributed cloud computing network.

10. The server of claim 9, wherein the ML features file is received periodically in an order of seconds or minutes.

11. The server of claim 8, wherein the ML feature manager service further aggregates the ML features based on previous requests received at the request processing module.

12. The server of claim 8, wherein the wait-free synchronization technique includes maintaining two separate memory-mapped files for storing ML features and using synchronization state to coordinate access by the ML feature library to the two separate memory-mapped files.

13. The server of claim 8, wherein serializing the first data structure is done according to a zero-copy deserialization technique, and wherein deserializing includes only a pointer addition and a cast to an array of numerical float features or categorical features.

14. The server of claim 13, wherein the zero-copy serialization technique includes structuring an encoded representation of the first data structure to match an in-memory representation of its source type.

15. A non-transitory machine-readable storage medium that provides instructions that, if executed by a processing system of a first server of a plurality of servers of a distributed cloud computing network, will cause said processing system to perform operations comprising:
  populating a first data structure with machine learning (ML) features;
  serializing the first data structure into bytes;
  storing state data indicating that one or more reader processes are to read from a first memory mapped data file and not a second memory mapped data file;
  writing the serialized bytes to the second memory mapped data file based on the stored state data indicating that that one or more reader processes are to read from the first memory mapped data file and not the second memory mapped data file;
  responsive to the writing of the serialized bytes to the second memory mapped data file being confirmed, updating the state data to indicate that the one or more reader processes are to read from the second memory mapped data file and not the first memory mapped data file;
  receiving a request;
  parsing the request to prepare keys from attributes of the request;
  determining, from the state data, to read from the second memory mapped data file and not the first memory mapped data file;
  reading the serialized bytes from the second memory mapped data file that correspond to the keys;
  deserializing the read serialized bytes; and
  copying the deserialized bytes to a second data structure available to an inference algorithm.

16. The non-transitory machine-readable storage medium of claim 15, wherein the ML features are included in an ML features file that is received from a second server of the distributed cloud computing network.

17. The non-transitory machine-readable storage medium of claim 16, wherein the ML features file is received periodically in an order of seconds or minutes.

18. The non-transitory machine-readable storage medium of claim 15, wherein the ML features are aggregated by the first server based on previous requests received at the first server and made available within single-digit milliseconds to subsequent requests.

19. The non-transitory machine-readable storage medium of claim 15, wherein serializing the first data structure into bytes is performed according to a zero-copy deserialization technique, and wherein deserializing the read serialized bytes only includes a pointer addition and a cast to an array of numerical float features or categorical features.

20. The non-transitory machine-readable storage medium of claim 19, wherein the zero-copy deserialization technique includes structuring an encoded representation of the first data structure to match an in-memory representation of its source type.

21. The non-transitory machine-readable storage medium of claim 15, wherein the operations further include:
  wherein the ML features are included in an ML features file that is received from a second server of the distributed cloud computing network;
  receiving an updated ML features file from the second server;
  parsing the received ML features file and populating the first data structure with the parsed data;
  serializing the first data structure into bytes;
  determining, based on the state data, to write to the first memory mapped data file as the second memory mapped data file is active for reading by the one or more reader processes;
  storing the serialized bytes in the first memory mapped data file; and
  updating the state data to indicate that the one or more reader processes are to read from the first memory mapped data file and not the second memory mapped data file for subsequent reads.

* * * * *